United States Patent
Ohishi et al.

(10) Patent No.: US 6,798,580 B2
(45) Date of Patent: Sep. 28, 2004

(54) PROJECTION TYPE IMAGE DISPLAY APPARATUS

(75) Inventors: Tetsu Ohishi, Tokyo (JP); Hiroki Yoshikawa, Tokyo (JP); Satoshi Ouchi, Tokyo (JP); Taro Imahase, Tokyo (JP); Tomohiro Miyoshi, Tokyo (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 10/295,373

(22) Filed: Nov. 14, 2002

(65) Prior Publication Data

US 2003/0197944 A1 Oct. 23, 2003

(30) Foreign Application Priority Data

Apr. 17, 2002 (JP) ........................................ 2002-114113

(51) Int. Cl.[7] ............................................. G02B 27/14
(52) U.S. Cl. ...................................................... 359/634
(58) Field of Search ................................ 359/634, 649, 359/636, 640, 619; 353/31, 33, 37; 348/335, 336, 338, 339

(56) References Cited

U.S. PATENT DOCUMENTS

| | | |
|---|---|---|
| 5,528,318 A | 6/1996 | Janssen |
| 5,548,347 A | 8/1996 | Melnik et al. |
| 5,845,981 A * | 12/1998 | Bradley ........................ 353/31 |
| 6,170,953 B1 * | 1/2001 | Lee et al. ..................... 353/82 |
| 6,219,110 B1 | 4/2001 | Ishikawa et al. |
| 6,288,815 B1 | 9/2001 | Lambert |
| 6,540,362 B1 * | 4/2003 | Janssen ........................ 353/31 |
| 2002/0118311 A1 | 8/2002 | Mamoto et al. |

FOREIGN PATENT DOCUMENTS

WO WO 01/72049 A 9/2001

* cited by examiner

*Primary Examiner*—Hung Xuan Dang
*Assistant Examiner*—Joseph Martinez
(74) *Attorney, Agent, or Firm*—Townsend and Townsend and Crew LLP

(57) ABSTRACT

A projection type image display apparatus includes a light axis moving unit for moving a direction of a light from a light source substantially in parallel periodically at a predetermined rate, a light separating unit for separating the light from the light axis moving unit into a plurality of color light components of predetermined wavelength bands, and a radiation unit for radiating the color light components from the light separating unit on an image display device, projecting an optical image corresponding to the image signal in enlarge form.

1 Claim, 5 Drawing Sheets

PROJECTION TYPE IMAGE DISPLAY APPARATUS

CROSS REFERENCE TO RELATED APPLICATION

This application is related to and claims priority from Japanese Application No. 2002-114113, filed Apr. 17, 2002.

BACKGROUND OF THE INVENTION

The present invention relates to an image display apparatus such as a liquid crystal projection apparatus, a reflection type image display projection apparatus or a projection type display apparatus for projecting an image on the screen using an image display device such as a transmission type liquid crystal panel or a reflection type image display device as a light bulb, or in particular to a technique whereby the light from a light source is separated into color light components of predetermined wavelength bands and radiated periodically on an image display device. In this way, the light from the light source of an image display apparatus for projecting an optical image corresponding to an image signal in enlarged form is separated into color light components of predetermined wavelength bands and radiated on the image display device.

In the image display apparatus, an image display device is required for each color because a color image is obtained by projecting the image for each of the colors including red, green and blue, for example, having predetermined wavelengths at a single point. In view of the fact that the image display device is expensive on the one hand and the need of saving energy on the other hand, however, a method has been employed in which images of a plurality of colors are displayed with a single image display device.

The conventional image display apparatus comprising a single image display device will be explained with reference to FIG. 7.

FIG. 7 is a schematic diagram for explaining the configuration of the essential parts of the conventional image display apparatus. In the image display apparatus shown in FIG. 7, the light emitted from a light source 2 of a lamp such as a high-pressure mercury lamp included in a light source unit 1 is reflected from a condensing reflector 3 and enters a cross prism 22 for color separation. The cross prism 22 includes reflection films crossed so as to reflect two types of light, and separates the light into the three color light components of red, green and blue by reflection and transmission.

Each color light component thus separated enters into optical axis moving units 4B, 4G, 4R for moving the optical axis in substantially parallel directions, and makes up the light components 24, 25, 26 with the optical axes thereof repeatedly moved in substantially parallel directions. The optical axis moving units are implemented by moving reflectors in parallel or by rotating a parallelepiped and causing the light to enter into it in the direction perpendicular to the rotational axis thereby to displace the optical axis horizontally with parallel flat plates.

The light components 24, 25, 26 with the optical axes thereof repeatedly moved substantially in parallel enter the reflectors 23B, 23G, 23R arranged in obliquely spaced relation with each other for reflecting each color component selectively. The light components of the three colors are sequentially synthesized and radiated on the image display device. In the process, the positions of the three color light components are controlled individually by the optical axis moving units in order to prevent the color light components from radiating the same position of the image display device 6 at the same time and to prevent the color components from being mixed with each other.

Each light component thus radiated is modulated by the image of the particular color, and the modulated image light component of each color is projected in enlarged form on a screen 8 through a projection lens 7 thereby to produce a color image.

SUMMARY OF THE INVENTION

The conventional image display apparatus having the configuration described above poses the problem that in spite of the need of a single image display device, the optical axis moving unit is required for each color. Therefore, the apparatus is bulky, and it is difficult to obtain a compact and inexpensive apparatus.

The object of this invention is to provide a compact image display apparatus by obviating this problem.

In order to achieve the object described above, according to this invention, there is provided an image display apparatus for separating the light from a light source into color light components of predetermined wavelength bands and radiating them periodically on an image display device thereby to project an optical image corresponding to an image signal in enlarged form, the apparatus comprising an optical axis moving unit for moving the direction of the light from the light source periodically at a predetermined rate substantially in parallel and a light separating unit for separating the light from the optical axis moving unit into color light components of a plurality of predetermined wavelength bands, wherein the color light components emitted from the light separating unit are radiated on the image display device thereby to project an optical image corresponding to the image signal in enlarged form.

In the image display apparatus according to this invention, the direction of the light proceeding from the light source is moved periodically in parallel by the optical axis moving unit, after which the light is separated into a plurality of color light components having predetermined wavelength bands and radiated on the image display device. As a result, a fewer number of optical axis moving units are used, thereby making it possible to produce a compact image display apparatus.

Other objects, features and advantages of the invention will become apparent from the following description of the embodiments of the invention taken in conjunction with the accompanying drawings.

DESCRIPTION OF THE EMBODIMENTS

Several embodiments of the invention will be explained below with reference to the accompanying drawings.

Figure 1:
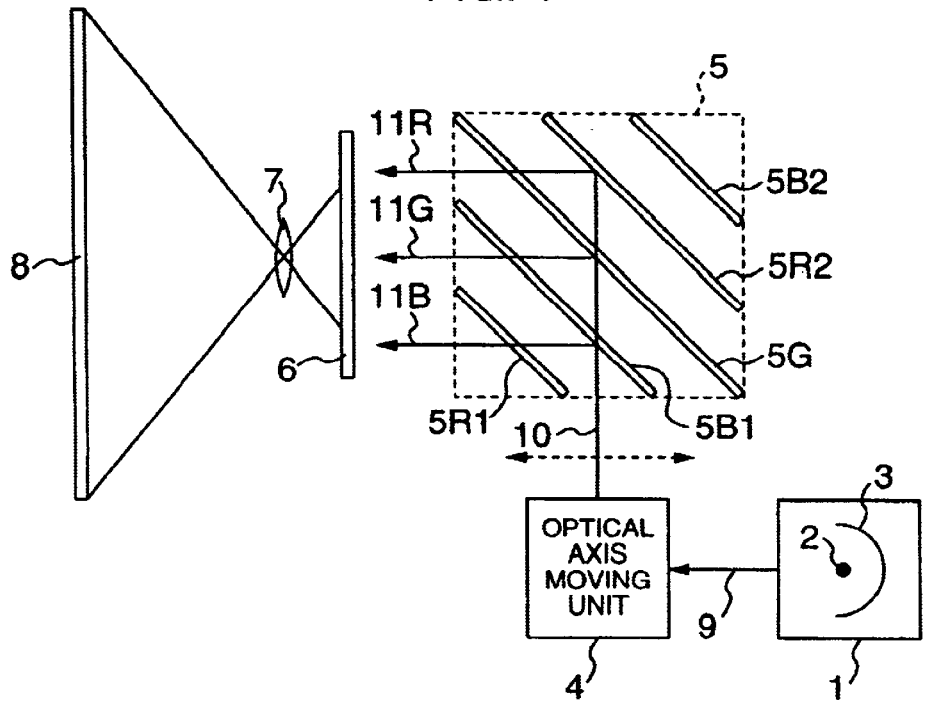
FIG. 1 is a diagram showing an optical configuration of an image display apparatus according to a first embodiment of this invention.

FIG. 1 is a diagram showing an optical configuration according to a first embodiment of the invention, and illustrates an image display apparatus using a single transmission type image display device as a light bulb.

In FIG. 1, reference numeral 1 designates a light source unit, numeral 2 a light source, numeral 3 a reflector, numeral 4 an optical axis moving unit for moving the position of the optical axis of the light radiated, numeral 5 a light separating unit for separating the light into light fluxes having a plurality of predetermined wavelength bands of such as red, green and blue color components, numeral 6 a display device for modulating and displaying the light, numeral 7 a projection unit for projecting, in enlarged form, the image light modulated by the display device, and numeral 8 a screen.

The image display apparatus comprises the light source unit 1 having the light source 2, which is a white lamp such as an ultrahigh pressure mercury lamp, a metal halide lamp, a xenon lamp, a mercury xenon lamp or a halogen lamp.

The light emitted from the light source 2 is condensed and reflected by the reflector 3 having an elliptic, parabolic or aspheric surface.

The illuminance distribution is improved and the radiation range defined by a pair of condensing lenses or collimator lenses (not shown) arranged in a rectangular frame substantially of the same size as the exit opening of the reflector 2. The resulting light is converted by polarization through a polarization conversion device (not shown) as required and emitted from the illumination unit.

The light 9 emitted from the illumination unit 1 enters into the optical axis moving unit 4. The optical axis moving unit 4 moves the optical axis repeatedly substantially in parallel by such a method as moving the light reflectors in parallel or rotating a parallelepiped and causing the light to enter into in the direction perpendicular to the rotational axis thereby to displace the optical axis horizontally with parallel flat plates.

The light 10 that has left the optical axis moving unit 4 enters into the light separating unit 5. The light separating unit 5 includes a first light reflector 5R1 for reflecting the light component of the red wavelength band and transmitting the light components of the other wavelength bands, a second light reflector 5B1 for reflecting the light of the blue wavelength band and transmitting the light of the other wavelength bands, a third light reflector 5G for reflecting the light of the green wavelength band and transmitting the light of the other wavelength bands, a fourth light reflector 5R2 for reflecting the light of the red wavelength band and transmitting the light of the other wavelength bands and a fifth light reflector 5B2 for reflecting the light of the blue wavelength band and transmitting the light of the other wavelength bands. All of these light reflectors are tilted with respect to the optical axis and arranged in spaced relation with each other to avoid the mixing between adjacent colors. The light 10 that has left the optical axis moving unit 4, therefore, first has the blue component thereof reflected by the second light reflector 5B1, and after being transmitted through the first light reflector 5R1, radiates the blue light component 11B on one edge of the image display device at the position shown. The red and green light components transmitted through the second light reflector 5B1, on the other hand, have the green light component thereof reflected by the third light reflector 5G and after being transmitted through the second light reflector 5B1, radiate the green light component 11G at substantially the center of the image display device through. Also, the red light component transmitted through the third light reflector 5G has the red light component thereof reflected by the fourth light reflector 5R2 and after being transmitted through the third light reflector 5G, radiates the red light component 11R at the image display device at an edge different from the position irradiated with the blue light component 11B. The light 10, that has left the optical axis moving unit 4 is emitted while moving to a different position from FIG. 1, is radiated on the image display device by being separated into color components corresponding to the incident position of the light separating unit 5. Therefore, the movement of the light by the optical axis moving unit 4 also moves the color components radiated on the image display device.

The light radiated on the image display device 6 is modulated by the image on the display surface of the display device 6 and exits from it. This exit light is enlarged by the projection lens 7 or the like and projected in enlarged form on the screen 8 thereby to produce a color image.

Now, the operation in which the color light components radiated on the image display device 6 by the light separating unit 5 are moved with the movement of the light by the optical axis moving unit 4 will be explained in detail with reference to FIGS. 2A to 2F.

FIGS. 2A to 2F are schematic diagrams for explaining the principle in which with the movement of the light by the optical axis moving unit 4 of the image display apparatus according to the invention, the light is separated into predetermined color light components by the light separating unit 5 on the one hand, and diagrams for explaining the distribution of the light radiated on the image display device on the other hand.

Figure 2A:
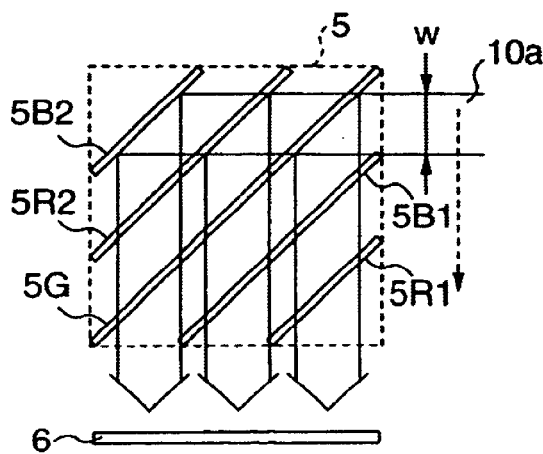
FIGS. 2A to 2F are schematic diagrams for explaining the principle of the image display apparatus and diagrams for explaining the distribution of the light radiated on the image display device according to the invention.
Figure 2A:
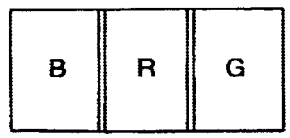
Figure 2B:
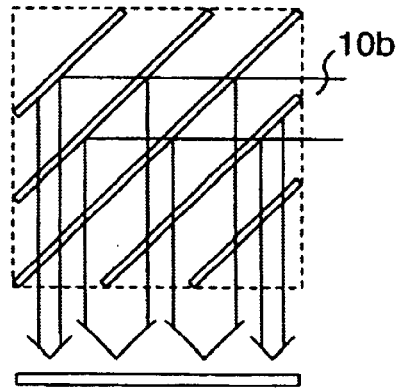
Figure 2B:
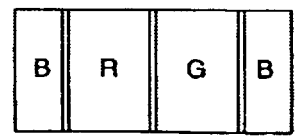
Figure 2C:
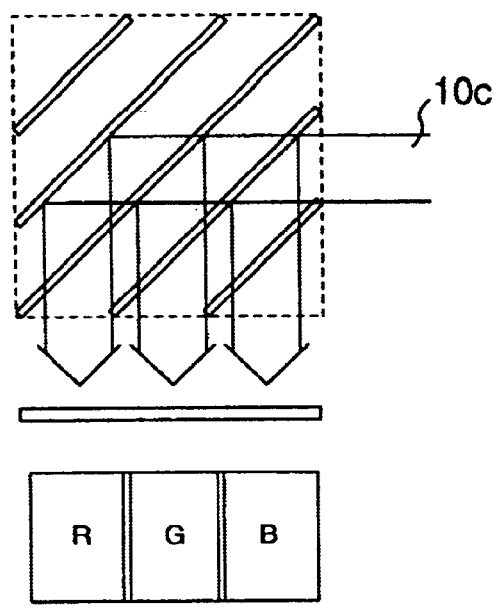
Figure 2D:
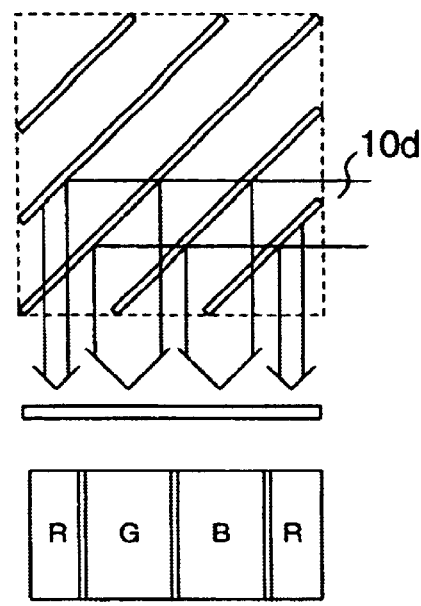
Figure 2E:
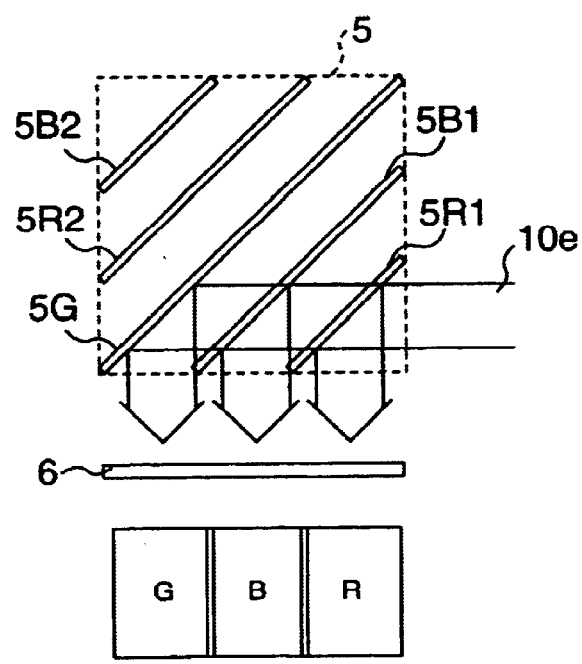
Figure 2F:
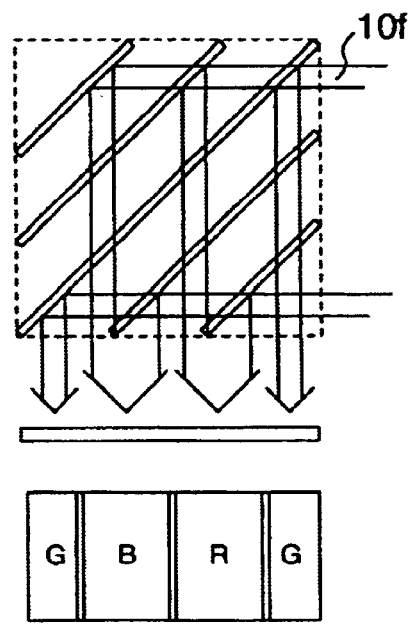

In FIGS. 2A to 2F, the light 10 leaving the optical axis moving unit 4 moves in parallel to the direction of dashed arrow with the light fluxes of width w from the light source. Assume that the light indicated at the position shown in FIG. 2A is the light 10a, the light indicated at the position shown in FIG. 2B is the light 10b, the light indicated at the position shown in FIG. 2C is the light 10c, the light indicated at the position shown in FIG. 2D is the light 10d, the light indicated at the position shown in FIG. 2E is the light 10e and the light indicated at the position shown in FIG. 2F is the light 10f. The light 10 at each position is radiated on the image display device while moving in colored form as shown by being separated through the five light reflectors of the light separating unit 5. The light 10 leaving the optical axis moving unit 4, therefore, upon movement in parallel to the direction of dashed arrow with the light fluxes of width w from the light source, is moved and radiated with each color separated. As described above, each color separated in similar fashion is moved also on the screen. Once the parallel movement goes through a cycle, every position is displayed with all the colors. In the case where the repetitive period is not less than about 60 cycles per second, therefore, viewers can observe a color image.

The width w of the light flux is set to such a value that the light is radiated in a range narrower than one third of the width of one side on the image display device, taking the avoidance of color mixing, the light utilization factor and the size of the non-image display section into consideration. For this purpose, an optical device such as a lens may be provided in the light path to define the radiation range and improve the illuminance of the light 9 leaving the illumination unit as required.

According to the embodiments of the invention, the light to be separated into the color light components of the wavelength bands of red, blue and green is selectively reflected by five reflection films (light reflectors) arranged diagonally with respect to the optical axis and in spaced relation with each other in the order of separation of the respective color light components. Nevertheless, the reflection films may be in the number twice the number of the color light components into which the light is to be separated, less one. In the case where the light is separated into two color light components, for example, three reflection films are arranged diagonally with respect to the optical axis.

In the image display apparatus according to the invention described above, the direction in which the light proceeds from the light source is moved periodically, and the light, after being separated into a plurality of color light components of predetermined wavelength bands and emitted, is radiated on the image display device thereby to project an optical image corresponding to the image signal in enlarged form. As a result, an inexpensive, compact image display apparatus can be configured with a single image display device and a single optical axis moving unit.

The embodiment described above employs a transmission type image display device as a light bulb. Now, an explanation will be given of a second embodiment employing a reflection type image display device, or especially, a single image display device utilizing the polarization.

Figure 3:
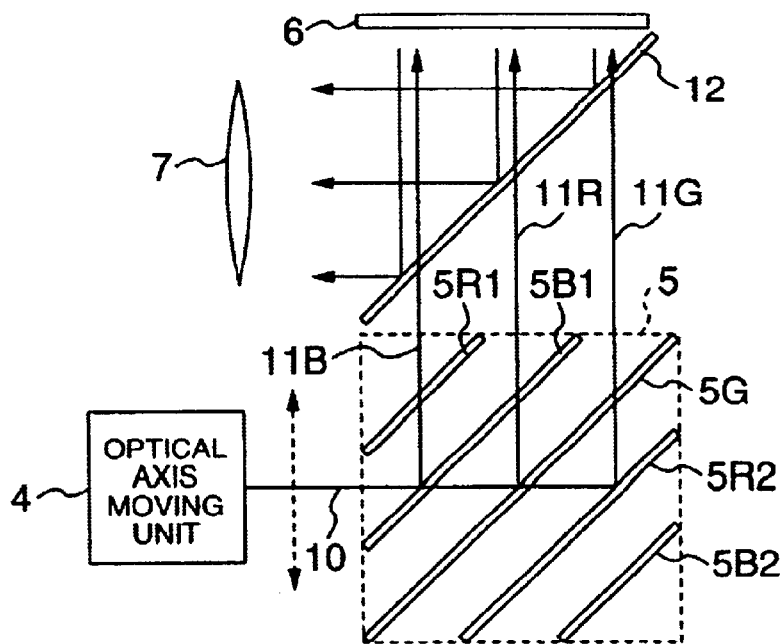
FIG. 3 is a diagram showing an optical configuration of an image display apparatus according to a second embodiment of this invention.

FIG. 3 is a diagram showing an optical configuration of an image display apparatus according to a second embodiment of the invention, in which a single reflection type image display device utilizing the polarization is used as a light bulb.

In FIG. 3, numeral 12 designates a polarizing reflector for transmitting or reflecting the light by polarization. Numerals 4 to 11 designate the same component parts as those designated by the same reference numerals, respectively, in the first embodiment.

In this image display apparatus, like in the first embodiment, the light from a light source enters into the optical axis moving unit 4 through a group of optical devices (not shown) for improving the illuminance distribution, defining the range of radiation and conversion by polarization. The optical axis moving unit 4 is adapted to move the optical axis repeatedly substantially in parallel by a method in which the light reflectors are moved in parallel or a method in which a parallelepiped is rotated and the light is caused to enter into in the direction perpendicular to the rotational axis thereby to shift the optical axis horizontally by use of a parallel flat plate.

The light 10 that has left the optical axis moving unit 4 enters into the light separating unit 5. The light that has entered into the light separating unit 5 exits after being separated into the three light components including the red light component 11R, the green light component 11G and the blue light component 11B by the light reflectors for selectively reflecting the light components in each wavelength band in the same manner as in the first embodiment.

The light that has exited from the light separating unit 5 enters into the polarizing reflector 12 arranged diagonally. In the case where the polarized light transmitted through the polarizing light reflector 12 is combined with the polarized light leaving the light separating unit 5, the light that has exited from the light separating unit 5 is transmitted through the polarizing reflector 12 and radiated on the image display device 6. As in the first embodiment, assume that the light 10 that has exited from the optical axis moving unit 4 exits by moving to a position different from the position indicated in FIGS. 2E, 2F. Then, the light is separated into the color components corresponding to the point of incidence of the light separating unit 5 described above and radiated on the image display device. Once the light is moved by the optical axis moving unit 4, therefore, the color light components radiated on the image display device are also moved.

The light radiated on the image display device 6 is changed in polarization by being modulated with the image on the display surface. The light that has entered into the image display device as the S polarized light, for example, is modulated into the P polarized light. As a result, the light modulated and leaving the image display device 6 is reflected on the polarizing reflector 12, and projected on the screen 8 in enlarged form through the projection lens 7 or the like thereby to produce an enlarged color image.

In the image display apparatus according to the invention, the light is moved by the optical axis moving unit 4 while being separated into predetermined color light components on the same principle as in the first embodiment.

As described above, with the image display apparatus according to this invention, the direction in which the light from the light source proceeds is moved periodically at a predetermined rate substantially in parallel, and the exit light is separated into a plurality of color light components of predetermined wavelength bands. The predetermined polarized exit light components thus separated are selectively radiated on a single reflection type display device. At the same time, the polarized light modulated by the image display device is emitted in a direction different from the direction of incidence of the separated light, so that an optical image corresponding to the exit image signal is projected in enlarged form. Thus, an inexpensive, compact image display apparatus can be configured of a single reflection type image display device and a single optical axis moving unit.

The embodiment described above represents a case in which a reflection type image display device utilizing the polarization is employed as a light bulb. An explanation will be given below of a third embodiment employing a single reflection type image display device having a plurality of fine light reflectors.

Figure 4:
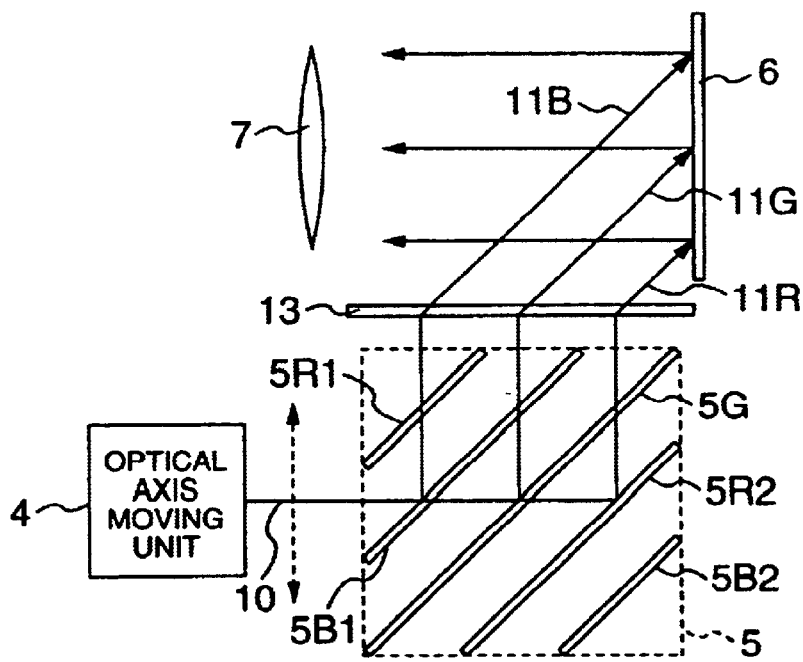
FIG. 4 is a diagram showing an optical configuration of an image display apparatus according to a third embodiment of this invention.

FIG. 4 is a diagram showing an optical configuration of an image display apparatus according to a third embodiment of the invention, which employs a single reflection type image display device having a plurality of fine light reflectors as a light bulb.

In FIG. 4, numeral 13 designates a hologram device having the function of bending the light in a predetermined direction. Numerals 4 to 11 designate the same component parts as the corresponding numerals, respectively, in the first embodiment.

In the image display apparatus according to this embodiment, like in the first embodiment, the light of a light source enters into the optical axis moving unit 4 through a group of optical devices (not shown) for improving the illuminance distribution and defining the radiation range of the light from the light source. The optical axis moving unit 4 repeatedly moves the optical axis substantially in parallel repeatedly by moving the light reflectors in parallel or by rotating a parallelepiped thereby to cause the light to enter it in the direction perpendicular to the rotational axis and thereby displacing the optical axis horizontally using a parallel flat plate.

The light 10 that has left the optical axis moving unit 4 enters into the light separating unit 5. The light that has entered into the light separating unit 5, like in the first embodiment, exits by being separated into the three color light components including the red light component 11R, the green light component 11G and the blue light component 11B through the light reflectors for selectively reflecting the light of each wavelength band.

The light that has left the light separating unit 5 enters into the hologram device 13, and exiting it with the optical axis thereof bent to a predetermined angle, is radiated on the image display device 6. As in the first embodiment, the light 10, which leaves the optical axis moving unit 4 while moving to a position different from that in FIGS. 2E, 2F, is radiated on the image display device by being separated into a plurality of color components corresponding to the incident point of the light separating unit 5. With the movement of the light by the optical axis moving unit 4, therefore, the color light components radiated on the image display device 6 are also moved.

The image display device 6 having a plurality of fine light reflectors functions to change the angle of the fine reflection surface in accordance with the image and thereby lead the image-displaying light in the direction perpendicular to the image display device 6 while leading the non-image-displaying light to such an angle as to be prevented from entering into the projection lens. As a result, the color light components radiated on the image display device 6 are reflected in accordance with the image associated with a particular color component and projected in enlarged form on the screen by the projection lens 7 or the like thereby to produce a color image.

In the image display apparatus according to this invention, the movement of the light by the optical axis moving unit 4 causes the light separating unit 5 to move the light by separating it into predetermined color light components on the same principle as in the first embodiment.

In the image display apparatus according to this invention described above, the direction in which the light from the light source proceeds is periodically changed and the exit light is separated into a plurality of color light components of predetermined wavelength bands. The exit light components thus separated are bent in a predetermined direction and radiated on a single reflection type image display device, so that an optical image corresponding to the image signal emitted from the particular image display device is projected in enlarged form. Therefore, an inexpensive, compact image display apparatus of reflection type is provided by a single reflection type image display device having a plurality of fine light reflectors and a single optical axis moving unit.

According to the embodiment described above, reflection films for selectively reflecting the color light components separated by the light separating unit are arranged diagonally with respect to the optical axis in spaced relation with each other in the order of the colors separated. Various methods can be employed to attain this purpose, and some of them will be explained below.

Figure 5:
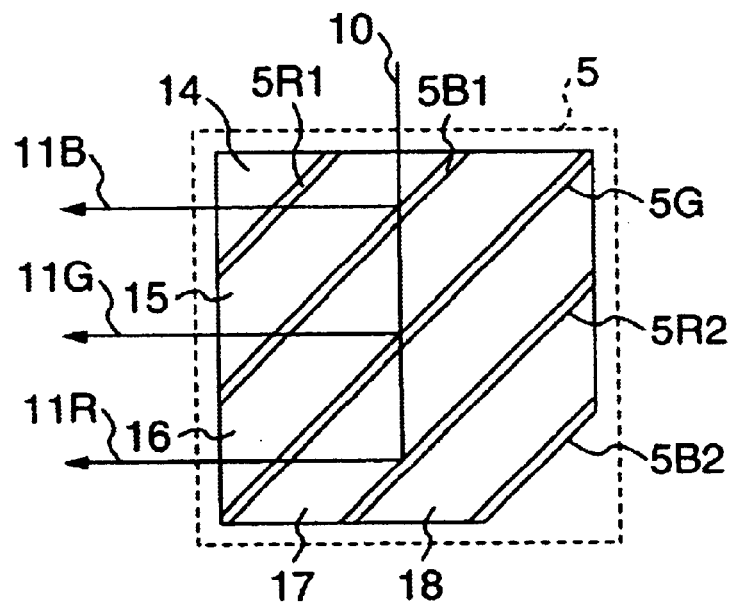
FIG. 5 is a schematic diagram for explaining a light separating unit used with the image display apparatus according to the invention.

FIG. 5 is a diagram for explaining a light separating unit of the image display apparatus according to another embodiment of the invention.

In FIG. 5, the light separating unit 5 entered by the light 10 is configured of a prism 14 formed with a first light reflector 5R1 for reflecting the light component in red wavelength band on one of the rectangular surfaces of the prism having a triangular section and transmitting the color light components having the other wavelength bands, a trapezoid prism 15 formed with a second light reflector 5B1 for reflecting the light component in blue wavelength band on one of the rectangular surfaces of the trapezoid prism having a trapezoidal section and transmitting the color light components having the other wavelength bands, a trapezoid prism 16 formed with a third light reflector 5G for reflecting the light component in green wavelength band on one of the rectangular surfaces of the trapezoid prism having a trapezoidal section and transmitting the color light components having the other wavelength bands, a trapezoid prism 17 formed with a fourth light reflector 5R2 for reflecting the light component in red wavelength band on one of the rectangular surfaces of the trapezoid prism having a trapezoidal section and transmitting the color light components having the other wavelength bands and a trapezoid prism 18 formed with a fifth light reflector 5B2 for reflecting the light component in blue wavelength band on one of the rectangular surfaces of the trapezoid prism having a trapezoidal section and transmitting the color light components having the other wavelength bands. All of these light reflectors are stacked with the first to fourth reflection films tilted with respect to the optical axis and arranged in spaced relation with each other to avoid the adjacent colors from mixing with each other. The light 10 that has left the optical axis moving unit 4, therefore, first has the blue component reflected on the second light reflector 5B1 at the position shown in FIG. 5, and after being transmitted through the first light reflector 5R1, radiates the blue light component 11b on one of the edges of the image display device. The red and green light components transmitted through the second light reflector 5B1, on the other hand, have the green component reflected on the third light reflector 5G, and after being transmitted through the second light reflector 5B1, radiates the green light component 11G substantially at the center of the image display device. Also, the red light component that has been transmitted through the third light reflector 5G is reflected on the fourth light reflector 5R2, and after being transmitted through the third light reflector 5G, radiated as a red light component 11R on an edge of the image display device different from the point irradiated with the blue light component 11B. When the light 10 that has left the optical axis moving unit (not shown) exits by moving to a different position from that shown in FIG. 6, it is separated into color light components corresponding to the point of incidence to the light separating unit 5 described above and then radiated on the image display device. With the movement of the light by the optical axis moving unit 4, therefore, the color light components radiated on the image display device are also moved, thereby producing the same effects as those described in the first embodiment.

The apparatus according to the invention does not necessarily employ the aforementioned configuration in which the reflection films for separating the light into a plurality of color light components of predetermined wavelength bands are interposed between one of the rectangular surfaces of the prism and one of the rectangular surfaces of the trapezoid prism on the one hand and between the opposed rectangular surfaces of a plurality of the trapezoid prisms on the other hand. Alternatively, a plurality of units for separating the light into a plurality of color light components of predetermined wavelength bands are so configured that a plurality of transparent flat plates each having a trapezoidal section formed, on at least one side thereof, with a reflection film for selectively reflecting the colors to be separated are stacked in predetermined spaced relation with each other, thereby making it possible to produce a similar effect.

The embodiments described above have been described based on the main light components. Actually, however, the light emitting portion of the light source has a finite length, and therefore the light has an expansion. An embodiment with a large expansion of the light will be explained below.

Figure 6:
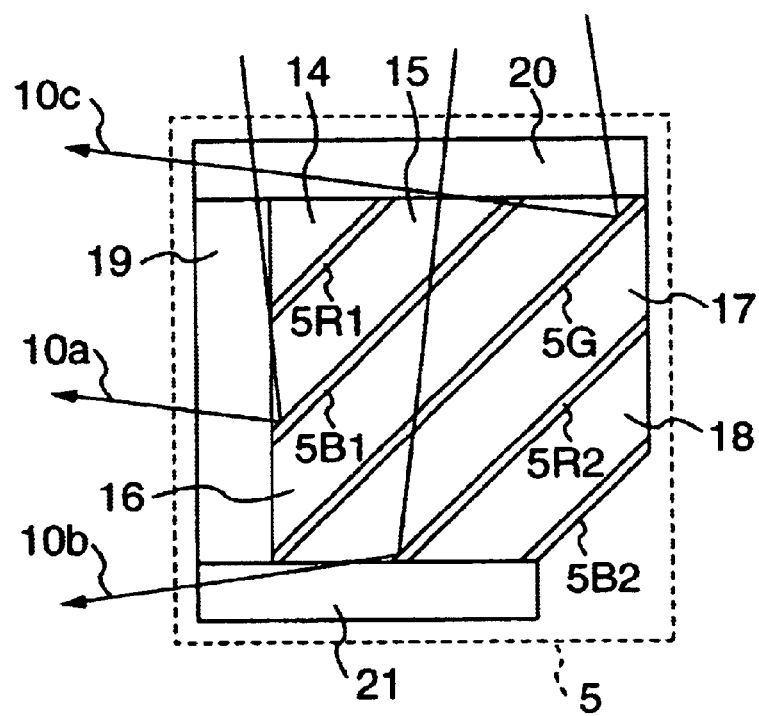
FIG. 6 is a schematic diagram for explaining another light separating unit used with the image display apparatus according to the invention.
Figure 7:
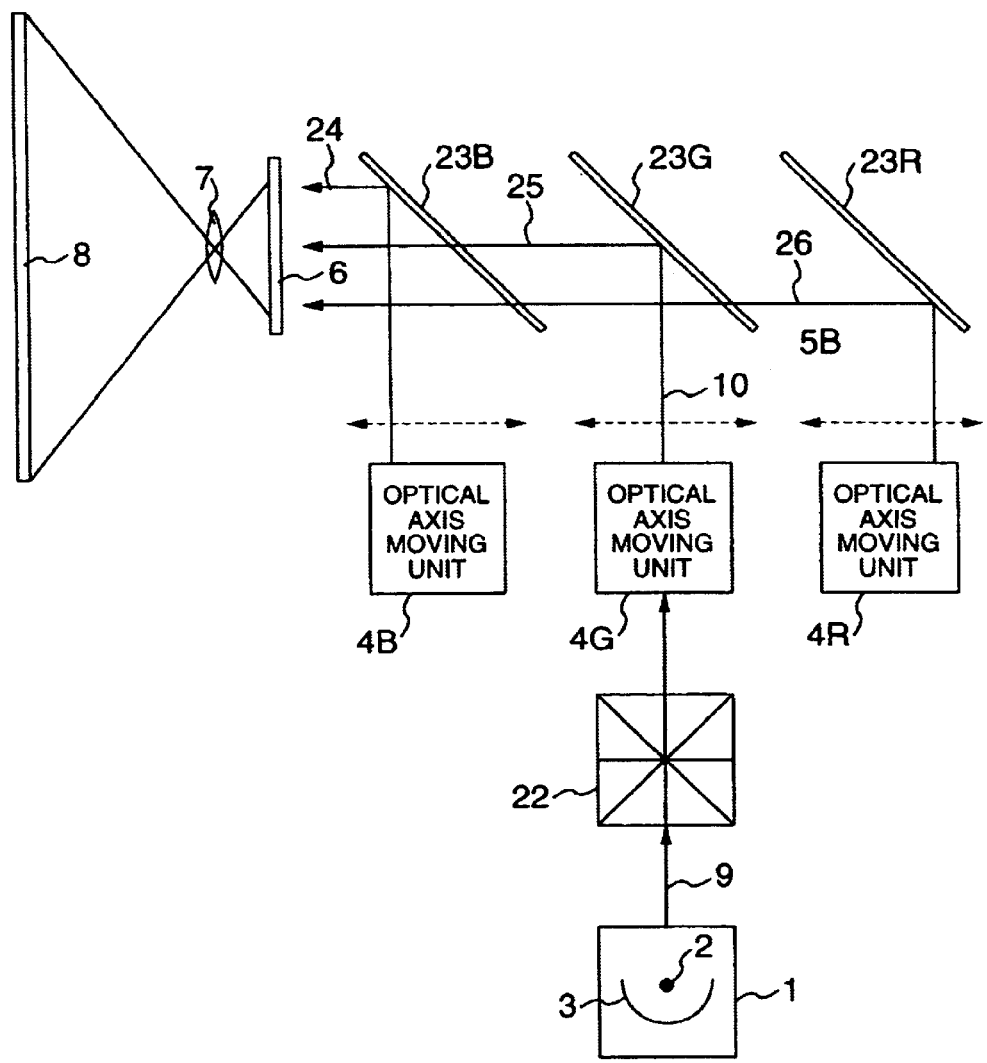
FIG. 7 is a diagram showing an optical configuration for explaining the conventional image display apparatus.

FIG. 6 is a diagram for explaining the light separating unit of an image display apparatus according to another embodiment of the invention.

In FIG. 6, the light separating unit 5 has the same configuration as the light separating unit 22 described above, except that the light separating unit 5 is defined by transparent members 19, 20, 21 on the three sides thereof. The functions of the reflection surface are identical to those of the embodiment described above, and therefore will not be explained. In the light separating unit 5 having this configuration, the incident light 10a having a large expansion is transmitted through a transparent member 20, and after being reflected on a second reflection surface through a trapezoid prism 15, leaves the light separating unit 5 through the trapezoid prism 15 and the transparent member 19. The incident light enters the trapezoid prism at a large incidence angle, or generally about 80 degrees. In the absence of the transparent member 19, therefore, the light is reflected on the incidence surface. According to this embodiment, this reflection is not caused in the presence of the transparent member 19 and therefore the light utilization factor is high.

In the case where the incidence point is different, the incident light 10b having a large expansion is transmitted through the transparent member 20 and reflected on the fourth reflector 5R2 through the trapezoid prism 15 formed with the second light reflector 5B1, the trapezoid prism 16 formed with the third light reflector 5G and the trapezoid prism 17 formed with the fourth light reflector 5R2. Then the light is reflected from the fourth reflector 5R2 and exits from the light separating unit 5 through the trapezoid prism 17 and the transparent member 21. In this case, the incident light enters into the transparent member 1 from the trapezoid prism 17 at a large incidence angle, or generally, at about 80 degrees. In the absence of the transparent member 21, therefore, the light would be reflected on the incident surface. According to this embodiment, however, the presence of the transparent member 21 prevents such reflection and therefore a high light utilization factor is achieved, while at the same time avoiding the color mixing which otherwise might be caused by irregular reflection.

Also in the case where the incident point is different, the incident light 10c having a large expansion is transmitted through the transparent member 20 and reflected on the third reflector 5G through the trapezoid prism 16 formed with the third light reflector 5G. The light thus reflected exits from the light separating unit 5 through the trapezoid prisms 15, 16 and the transparent member 20. In this case, the incident light enters into the transparent member 20 from the trapezoid prism 16 at a large angle, or generally, at about 80 degrees. In the absence of the transparent member 20, therefore, the light would be reflected on the incident surface. According to this embodiment, however, the presence of the transparent member 20 prevents such reflection, and therefore a high light utilization factor is achieved, while at the same time avoiding the color mixing which otherwise might be caused by irregular reflection.

These effects depend on the expansion angle of the light. Therefore, the transparent member is not necessarily included in the light separating unit 3 and only a practically effective surface thereof may have a transparent member.

The transparent member is preferably configured of a material having substantially the same refractive index as the trapezoid prism not to cause any refraction of the light on the bonding surface.

Also, the light separating unit according to this invention has a different number of reflection films and hence a different light amount passed through a light path depending on the light incidence point. This causes the irregularities of the brightness or color of the image. Therefore, the light separating unit can be configured alternately as described below. For example, the reflection films for separating the light into a plurality of the color light components of predetermined wavelength bands include an upper reflection film and a lower reflection film, the former having a smaller reflectivity than the latter. As a result, the difference of the transmittance between the light paths reflected by the upper and lower reflection films can be reduced thereby to realize a more uniform image. Also, a unit for absorbing a predetermined light is arranged on at least one of the incident surface and the exit surface of the unit for separating the light into a plurality of the color light components of predetermined wavelength bands, and the magnitude of absorption is so adjusted as to reduce the difference of the light amount between the path formed by the light reflected from the upper layer and the path formed by the light reflected from the lower layer thereby to realize a more uniform image.

The light separating unit according to this invention can differentiate the light path and the light path length depending on the incident point of the light. This might differentiate the distribution of the light radiated on the image display device and cause the irregularities of the brightness or color of the image. To obviate this, the following alternative configuration can be employed.

The media between the reflection films for separating the light into a plurality of color light components of predetermined wavelength bands are so configured that the refractive index of the medium on the reflection surface of the uppermost reflection film layer is smaller than the refractive index of the medium on the reflection surface side of the lowest reflection film layer. This configuration can reduce the difference of the light path length between the uppermost and the lowest layers converted in terms of the same refractive index into which the light path length is converted. As a result, the difference of the distribution of the light radiated on the image display device can be reduced thereby to reduce the irregularities of the brightness and the color of the image.

In spite of the foregoing explanation about the lowest reflection film layer limited to a selective color, the reflection is not necessarily limited to a selective color in view of the fact that the light entering the reflection film is the remainder after reflection of two color light components. This makes it possible to use a light reflector of a higher reflectivity, thereby improving the brightness.

Also, the spectral characteristic of each reflection film of the light separating unit is such as to eliminate the yellow and orange color components requiring no image color adjustment and thus to allow the unrequired light components to pass through the light separating unit. The light components that have been transmitted through each reflection film of the light separating unit are absorbed to prevent the stray light from being scattered in the image display apparatus. As a result, the deterioration of the contrast which otherwise might be caused by the scattered light can be prevented.

According to the embodiments of the invention described above, the red, green and blue color reflection films of the light separating unit are arranged in that order. Nevertheless, the reflection films may be arranged in a different order of colors, and is not limited to these color components. The effects of the image display apparatus according to the invention thus can be produced by a configuration in which the direction of the light proceeding from the light source is moved periodically, the exit light is separated into a plurality of color light components of predetermined wavelength bands, the exit light components separated are radiated on the image display device and an optical image corresponding to the image signal is projected in enlarged form.

Further, the embodiments of the invention are described above, in which the direction of the light proceeding from the light source is set in vertical direction. The invention is not limited to this direction, but is also apparently applicable to the movement of light in horizontal direction.

Furthermore, the foregoing description of the embodiments of the invention handles a unit by which the light leaving the light separating unit is radiated directly on the image display device. Nevertheless, the illumination light may be condensed at the focal point in or in the neighborhood of the light separating unit, the object surfaces of the relay lens having substantially the same magnification are rendered substantially coincident with the focal point, and the image surface position of the relay lenses is rendered substantially coincident with the position of the image display device, thereby making it possible to radiate the illumination light on the image display device accurately. Thus, the color mixing can be avoided with a high efficiency.

In the image display apparatus according to this invention, the light is passed through the optical axis moving unit in which the direction of the light proceeding from the light source is periodically moved, and then the light is separated into a plurality of color light components of predetermined wavelength bands before being radiated on the image display device. Therefore, a fewer optical axis moving units can be employed than in the prior art, thereby realizing a compact image display apparatus.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An image display apparatus for separating light from a light source into color light components of predetermined wavelength bands and radiating said color light components periodically on an image display device to project an optical image corresponding to an image signal in an enlarged form, comprising:

a light moving unit which moves the direction of said light from said light source substantially in parallel periodically at a predetermined rate;

a light separating unit which separates said light from said light moving unit into a plurality of color light components of predetermined wavelength bands; and a radiation unit which radiates said color light components from said light separating unit on said image display device;

wherein said light separating unit includes a plurality of reflection films arranged diagonally with respect to the optical axis for selectively reflecting said color light components to be separated, said reflection films being arranged in a predetermined spaced relation with each other in the order of the colors to be separated, wherein the number of layers of said reflection films is equal to twice the number of the color components to be separated, less one.

* * * * *